Oct. 30, 1951  A. W. BENNETT  2,572,973
SIGNALING SYSTEM FOR VEHICLES
Filed Nov. 16, 1949  2 SHEETS—SHEET 1
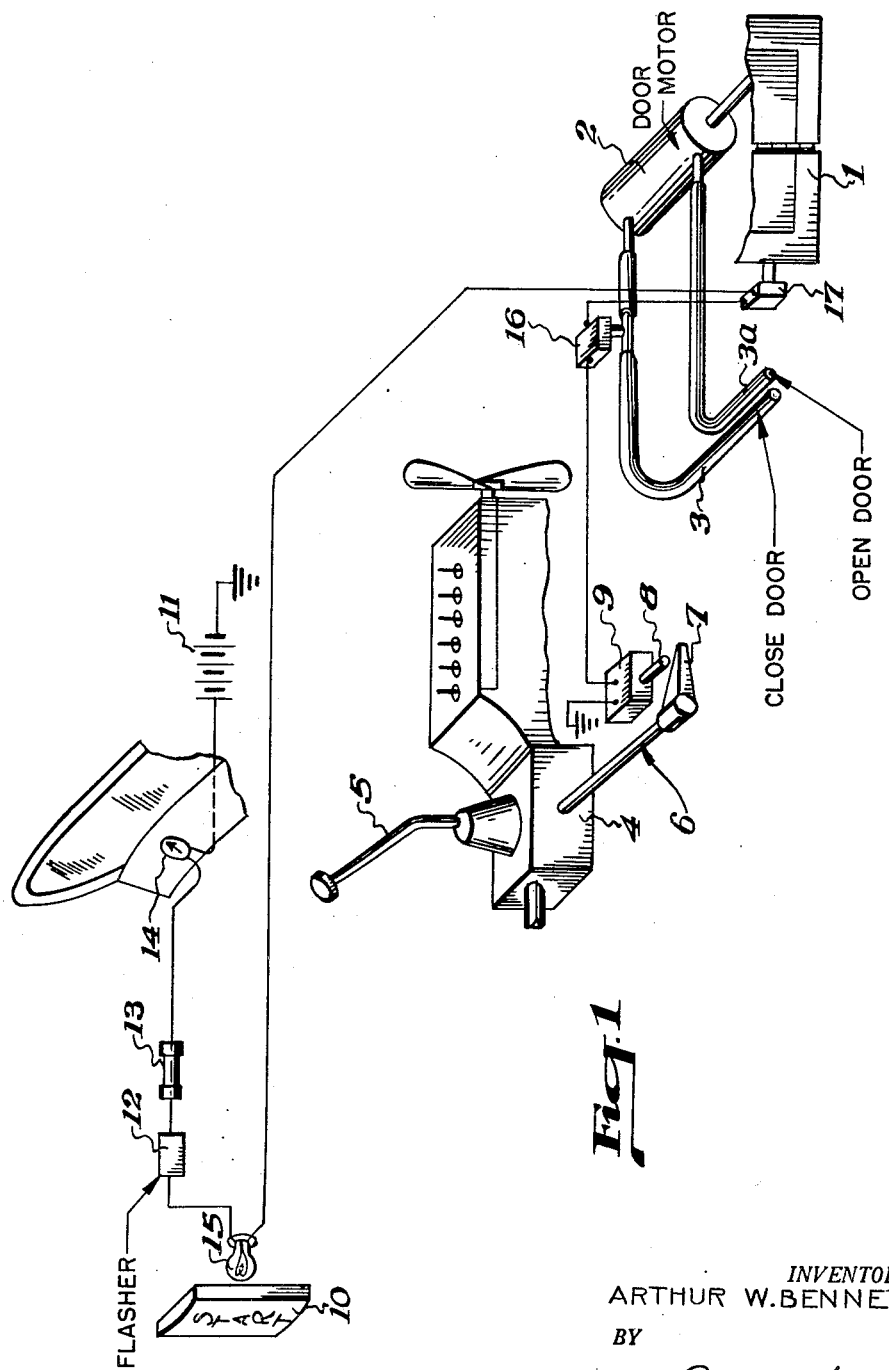
INVENTOR.
ARTHUR W. BENNETT.
BY
Richey & Watts
ATTORNEYS.

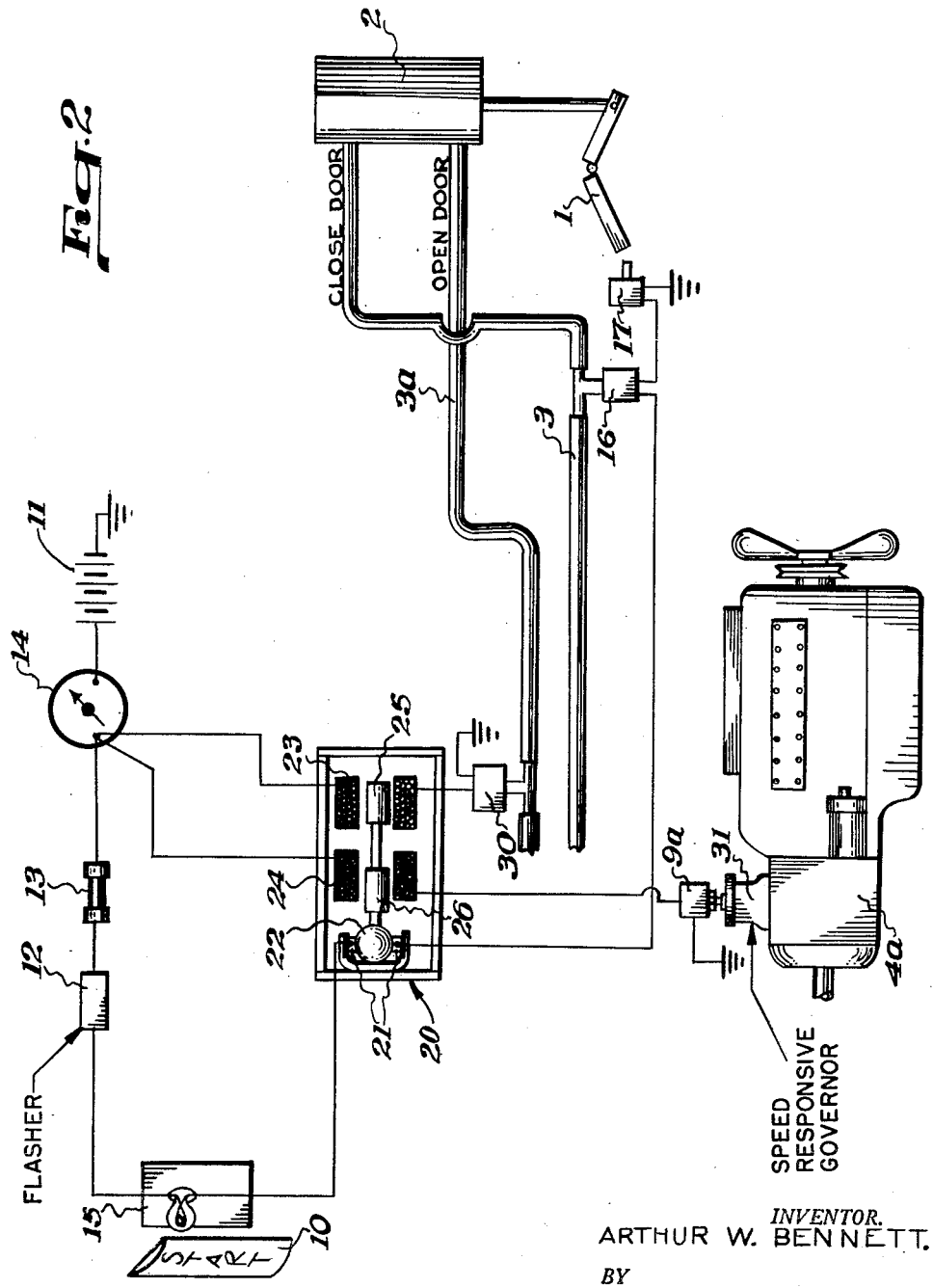

Patented Oct. 30, 1951

2,572,973

UNITED STATES PATENT OFFICE 2,572,973

SIGNALING SYSTEM FOR VEHICLES

Arthur W. Bennett, Erie, Pa.

Application November 16, 1949, Serial No. 127,603

5 Claims. (Cl. 177—339)

The present invention relates generally to the signalling art and particularly to a system which controls a signal on the outside of a vehicle body to give a visual indication when a vehicle is being started.

There are many occasions when it is quite desirable, or even necessary, that a signal be given to warn other vehicle drivers when a vehicle is about to start up. One such occasion arises when a trackless trolley which has stopped to discharge passengers just before reaching a cross street is about to start and go across the cross street. Often the driver of another vehicle, being unable to see whether or not the passengers are still being discharged therefrom, may start up and attempt to make a right-hand turn in front of the trolley with the result that a collision occurs. If a warning could be given to the operator of the rearward vehicle, the collision could be avoided. Another place where such an indicator has long been needed is on school buses, particularly in States where vehicles are required to stop when the school bus is taking on or discharging passengers. There are many other places where a signal of the character here under discussion would be quite useful, but so far as I know, no one heretofore has proposed a satisfactory indicator for such a purpose.

The present invention involves the automatic actuation of an indicator outside of a vehicle which will indicate to the drivers of other vehicles when the vehicle equipped with the indicator is being started. In one embodiment of the invention, the indicator system is operatively associated with the manually-shifted transmission and with the fluid pressure door-closing mechanism so that the indicator cannot be actuated until the doors have been closed and the transmission shifted to low gear. In another embodiment the invention is susceptible of use with vehicles equipped with automatic transmissions. In its broader aspects the invention may be used with vehicles equipped with manually-operated doors.

This invention will be better understood by those skilled in the art from the following specification and the drawings which accompany and form a part thereof and in which:

Fig. 1 is a diagrammatic view showing the present invention embodied in a system for use with a vehicle having a manually-controlled gear shift transmission;

Fig. 2 is a diagrammatic view showing a system embodying the present invention for use with a vehicle having an automatic transmission.

In the modification of the present invention shown in Fig. 1 the vehicle is provided with a door 1 operated under remote control by a door motor 2 which may be actuated to close the door by fluid under pressure conducted through conduit 3 from a controlled source of fluid pressure (not shown). It will be understood that the door motor 2 may also be equipped in the ordinary way with a conduit 3a to conduct fluid under pressure thereinto for opening the door.

The vehicle includes the usual engine and transmission assembly 4 and a gear shift lever 5 by means of which the gears in the transmission may be shifted in the conventional manner. A rod 6 is suitably associated with the gear shift lever and has affixed thereto an arm 7 which, when the gear shift lever is moved to low gear position, will be moved to engage the arm 8 on a normally open switch 9, one side of which is grounded and the other side of which is connected into the electrical signalling system.

This electrical signalling system includes a signalling circuit and conditioning means for opening and closing the signalling circuit. The signalling circuit includes an indicator 10 positioned on the outside of the vehicle body, a source of electrical energy which may be a battery 11, a flasher 12, fuses 13, ammeter 14, and signal bulb 15. In the form shown in Fig. 1 the conditioning means for the signal circuit includes the switch 9, a fluid pressure actuated switch 16, and a normally open door jamb operated switch 17, these several parts being connected in series with the signal circuit by suitable electrical conductors in the form shown in Fig. 1.

It can be seen that switches 9 and 16, as well as 17, may all be actuated to one (the closed) position wherein the signal circuit is completed, whereas if any one of the switches is actuated to its other position the signal circuit is interrupted. The switch 16 is spring-actuated to an open circuit position and is actuated to its closed position by fluid pressure in conduit 3. Pressure-operated switches of this type are well known in the vehicle signalling art and since details of this and other switches form no part of the invention, they are not included.

When switch 16 is in closed position, as occurs when fluid pressure is admitted into conduit 3 to cause the door motor to close the door, and when switch 17 is mechanically closed by the door itself, the electrical circuit is completed to the switch 9. The latter switch is closed when the gear shift lever 5 shifts the gears into low, whereupon arm 7 engages pin 8 closing the switch. At that time the flasher switch 12, which is of conventional construction, makes and breaks the signal circuit at short time intervals with the result that the bulb 15 in the indicator 10 is alternately lighted and turned off.

Since the indicator 10 is on the outside of the vehicle body, it is visible to drivers of other vehicles and will indicate to all such drivers the fact that the vehicle carrying the signal is about to be started and put into motion.

It will be noted that the signalling system is tied into the door-closing apparatus in such a way that so long as the door is open the start signal cannot be given. It is only when there is sufficient fluid pressure in conduit 3 to close switch 16 and when the door is actually closed to close switch 17 that the signalling device can operate, and then it can operate only if the gears have been shifted to low gear position to close switch 9. Thus, it will be seen that the indicator operates automatically when conditions are proper for starting the vehicle, particularly a vehicle in which fluid pressure closed doors are employed, but will not operate until proper conditions exist.

When the door motor is actuated to open the door, the fluid pressure in conduit 3 is decreased and switch 16 opens, thus breaking the circuit and interrupting the signal. Hence, the signal cannot be given while that condition exists even though the lever 7 may be maintaining switch 9 in closed position.

It will be understood that when the vehicle has been started in motion and the gears are shifted into second or third gears forward or into reverse, arm 7 will be moved out of engagement with arm 8 of switch 9 which will thereupon open under the influence of a spring therein and the signalling system will thereby be broken and will not again be re-established until the gears are shifted into low position and fluid pressure exists in conduit 3 sufficient to close switch 16.

In case a vehicle is not equipped with a fluid pressure actuated door-closing means, a manually-controlled system of levers will be substituted for the fluid motor 2 in order to open and close the door of the vehicle. In such an installation fluid pressure operated switch 16 can be omitted, but because of the presence of the door jamb switch 17 in the circuit the mode of operation of the signalling system will be unchanged because the signal circuit cannot be energized until the door is closed, thereby closing switch 17. It will be further understood that in some installations where the fluid motor 2 is provided for closing the door, the door jamb switch 17 could be omitted and reliance placed upon fluid pressure switch 16 for opening and closing the circuit as the door is opened and closed.

The arrangement shown in Fig. 2 accomplishes the same results as that previously described, but is particularly adapted for use in connection with vehicles wherein an automatic transmission is fitted rather than a manually-controlled transmission. In this system the arrangement of the door 1, actuating motor 2, conduits 3 and and 3a for the motor, battery 11, flasher 12, fuse 13, ammeter 14, signal 10 and its bulb 15 are unchanged. Also, the circuit conditioning switches including fluid pressure switch 16 and door jamb switch 17 are like that described in connection with the circuit shown in Fig. 1. Additional signal circuit conditioning means are provded in order to adapt the system for use in connection with an automatic transmission.

In order to properly condition the signal circuit, a special electrically-controlled or solenoid switch 20 is provided. This switch includes spring-mounted, insulated contacts 21 in series with the flasher circuit and a contactor 22 arranged so that it may be moved to the position shown in Fig. 2 to engage contacts 21 and complete the signal circuit or be moved out of engagement with contacts 21 to interrupt it. The position of the contactor 22 is determined by the operation of a pair of solenoid windings 23 and 24 which cooperate with their armatures 25 and 26, respectively, to move the contactor 22 toward and away from contacts 21. In this system a normally open pressure-operated switch 30 is included in the conduit 3a which is the door-opening conduit for motor 2, this switch being connected so that when fluid under pressure is in conduit 3a switch 30 is closed. Switch 30 has one side grounded and the other side connects to the solenoid winding 23 which in turn connects through the ammeter and battery 11 to ground. When switch 30 is closed, solenoid winding 23 is energized thereby drawing armature 25 within its field to close the contacts 21 in the signal or flasher circuit.

The other solenoid winding 24 is likewise connected to the ammeter and battery, but its circuit may be interrupted by a switch 9a which may be said to correspond to the transmission control switch 9 in the other modification. When switch 9a is closed the circuit through solenoid 24 is completed tending to draw armature 26 within the solenoid field and urging the contactor 22 away from the contacts 21, thereby interrupting the signal circuit. The opening and closing of switch 9a is controlled by a governor 31 which is speed responsive and connected by any known means to the automatic vehicle engine and transmission assembly 4a, the arrangement being that when the vehicle is at rest switch 9a is open and solenoid 24 de-energized.

Having briefly outlined the circuits and connections, the operation of this form of the invention may now be described. Assume the vehicle to be at rest and switch 20 open to de-energize the signal. When the vehicle is brought to rest and the door opened, fluid under pressure in conduit 3a closes contacts in switch 30, energizes solenoid 23, and draws contactor 22 toward contacts 21, the elements now appearing as shown in Fig. 2. Although switch 20 is now closed the signal circuit is not completed because as soon as the door opened, normally open door jamb switch 17 opened. It will be noted that with the vehicle at rest solenoid 24 is de-energized by switch 9a and so switch 20 remains closed.

When the operator is ready to start the vehicle in motion, he first closes the door by directing fluid under pressure to conduit 3. This closes the door jamb switch 17 which completes the signal circuit up to the pressure switch 16 which is likewise closed by the fluid pressure in the door-closing conduit 3. This energizes the signalling circuit up to contacts 21 and since contacts 21 are closed the flashing or start signal is now energized.

As the vehicle gains speed the governor 31 senses the speed and its switch-actuating mechanism is arranged so that switch 9a remains in its open circuit position until a relatively low cruising speed, such as 8 to 10 miles per hour, is attained by the vehicle. At this time the governor closes switch 9a, completing the circuit through solenoid 24 which draws its armature 26 into its magnetic field and withdraws contactor 22 from contacts 21. Thus, the starting signal circuit is de-energized automatically as the vehicle attains a normal minimum cruising speed. Even if the vehicle drops below cruising speed the signal circuit will not be energized until the vehicle door is again opened to energize closing solenoid 23. When the vehicle is brought to rest and the door opened by directing fluid to conduit 3a, switch 30 is again closed and solenoid 23, acting upon its armature 25, forces contactor 22 against contacts 21 thereby presetting the signal circuit for re-establishment by closing of the door and hence of switches 16 and 17.

Having thus described the present invention so that others skilled in the art may be able to understand and practice the same, I state that what I desire to secure by Letters Patent is defined in what is claimed.

What is claimed is:

1. In a vehicle having a body with a door therein and an engine and transmission assembly to propel the vehicle, the combination of means including a fluid pressure conduit to close the door, a fluid pressure conduit to open the door, an electrical signal circuit including an indicator visible from outside of the body and a source of electrical energy for said indicator, circuit conditioning means to open and close said signal circuit, said circuit conditioning means comprising first and second two position switches and associated circuit means, said circuit conditioning means being arranged so that with both of said switches in one position they condition the signal circuit for completion whereas actuation of either of said switches to another position opens said signal circuit, means connecting said first switch to said door-closing conduit, fluid pressure in said door-closing conduit actuating said first switch to said one position, means operatively associating said second switch with said engine and transmission assembly to actuate said second switch to said one position when said assembly is actuated to start the vehicle, and means to open said second switch when said engine and transmission assembly is adjusted to operate the vehicle at a given speed.

2. In a vehicle having a body with a door therein and an engine and transmission assembly to propel the vehicle, the combination of means including a fluid pressure conduit to close the door, a fluid pressure conduit to open the door, an electrical signal circuit including an indicator visible from outside of the body and a source of electric energy for said indicator, circuit conditioning means to open and close said signal circuit, said circuit conditioning means comprising first and second two position switches in series in said signal circuit, said switches being arranged so that with both of said switches closed they complete the signal circuit whereas actuation of either of said switches to the open position opens said signal circuit, means connecting said first switch to said door-closing conduit, fluid pressure in said door-closing conduit actuating closing said first switch, and means connecting said second switch with said transmission assembly to close said second switch when said assembly is shifted to start the vehicle, said last-named means being arranged to open said second switch when said transmission assembly is actuated to propel said vehicle at a higher speed.

3. In a vehicle having a body with a door therein and an engine and manually-controlled transmission assembly to propel the vehicle, the combination of means including a fluid pressure conduit to close the door, a fluid pressure conduit to open the door, an electrical signal circuit including an indicator visible from outside of the body and a source of electric energy for said indicator, circuit conditioning means to open and close said signal circuit, said circuit conditioning means comprising first and second switches in series in said signal circuit and arranged so that with both of said switches closed they condition the signal circuit for completion, opening of either of said switches interrupting said signal circuit, means connecting said first switch to said door-closing conduit, fluid pressure in said door-closing conduit closing said first switch, and means connected to said transmission assembly and arranged to close said second switch when said transmission is shifted into low gear to start the vehicle, said last-named means serving to cause said second switch to open when said transmission is shifted out of low gear.

4. In a vehicle having a body with a door therein and an engine and automatic transmission assembly to propel the vehicle, the combination of means including a fluid pressure conduit to close the door, a fluid pressure conduit to open the door, an electrical signal circuit including an indicator visible from outside of the body, a source of electric energy for said indicator, circuit conditioning means to open and close said signal circuit, said circuit conditioning means comprising first and second switches and a normally-closed solenoid switch in said signal circuit, and circuit means arranged so that with both of said switches in one position they condition the signal circuit for completion whereas actuation of either of said switches to another position opens said signal circuit, means connecting said first switch to said door-closing conduit, fluid pressure in said door-closing conduit actuating said first switch to close said signal circuit, circuit means connecting said second switch to the solenoid of said solenoid switch and to said energy source, and engine speed responsive means connected to said second switch and to said engine and transmission assembly to actuate said second switch to energize said solenoid and open said solenoid switch after the vehicle attains a predetermined speed.

5. In a vehicle having a body and a door therein, the combination of means including a fluid pressure conduit to close the door, a fluid pressure conduit to open the door, vehicle driving means including an engine and transmission to start and drive said vehicle, an electrical circuit including an indicator visible from outside of the body, a source of electrical energy, a first switch actuatable to closed position by fluid pressure in said door-closing conduit and a second switch to complete the circuit to ground, switch operating means connected with said vehicle driving means and serving to close said second switch when the engine is actuated to start the vehicle, said switch operating means serving to cause said second switch to open when said vehicle driving means is adjusted to operate said vehicle at a given speed.

ARTHUR W. BENNETT.

REFERENCES CITED

The following references are of record in the file of this patent:

UNITED STATES PATENTS

| Number | Name | Date |
|---|---|---|
| 902,014 | Stewart | Oct. 27, 1908 |
| 1,216,300 | Farmer | Feb. 20, 1917 |
| 1,436,507 | La Londe | Nov. 21, 1922 |
| 1,808,316 | Osgian | June 2, 1931 |
| 2,179,368 | Baad | Nov. 2, 1939 |